United States Patent Office 3,353,501
Patented Nov. 21, 1967

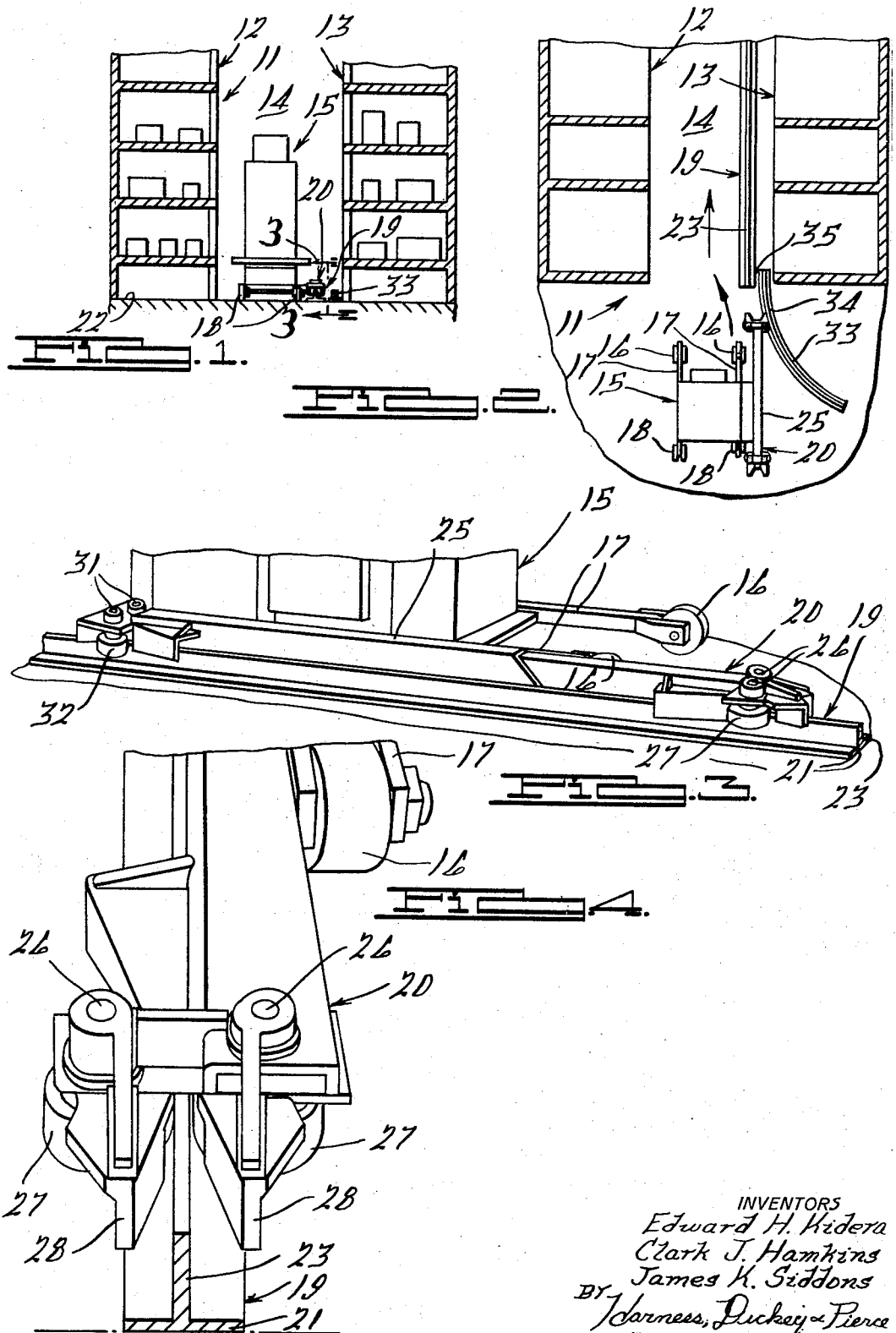

3,353,501
GUIDANCE SYSTEM
Edward H. Kidera, Lake Villa, Ill., and Clark J. Hamkins and James K. Siddons, Racine, Wis., assignors to Walker Manufacturing Company, a corporation of Delaware
Filed Oct. 21, 1965, Ser. No. 499,461
10 Claims. (Cl. 104—247)

ABSTRACT OF THE DISCLOSURE

A warehouse having storage racks defining a narrow aisleway and a self-propelled dirigible order picking vehicle for use in the warehouse. The vehicle has detachably connected to one of its sides a guide arrangement that coacts with a guide rail extending along the aisle for guiding the vehicle down the aisle without necessitating steering by its operator.

This invention relates to a guidance system and more particularly to a structure for guiding an order-picking vehicle along a narrow aisleway.

The use of order-picking vehicles for removing merchandise from warehouses or other similar types of storage areas is well known. Conventionally the order-picking vehicle is a self-propelled dirigible vehicle which the operator must drive down a narrow aisleway. As a safety factor, the aisleways are made considerably wider than the vehicle to insure against accidental running of the vehicle into the storage racks by the operator. Of course, such systems are not completely foolproof and frequently damage occurs to the storage racks by inadvertent action of the vehicle operator. In addition to this problem, the wider than necessary aisleways reduce the total storage volume of a given building.

It is, therefore, an object of this invention to provide a guidance system for automatically guiding an order-picking vehicle down a narrow aisleway without necessitating steering by the vehicle operator.

It is a further object of this invention to provide a guidance system for directing an order-picking vehicle down an aisleway to permit a reduction in width of the aisleway.

Systems have been proposed for guiding vehicles along a given path. Such systems may include either photoelectric or mechanical follower devices for coacting with a guide means and directing the vehicle along the guide means. The previously proposed systems, however, operate upon the steering system of the vehicle and thus unduly complicate its structure with an increase in its cost. Frequently, the aforementioned types of guidance systems also render the vehicle unusable for conventional operation.

It is, therefore, a further object of this invention to provide a guidance system for a self-propelled vehicle which guides the vehicle along a given path without any direct mechanical connection to the vehicle steering system.

It is a further object of this invention to provide a guidance system which may be utilized with a conventional self-propelled dirigible vehicle.

It is a still further object of the invention to provide a guiding follower mechanism that may be detachably connected to a conventional vehicle for guiding it along a path.

In an embodiment of the invention a guidance system is provided for guiding a multi-purpose dirigible vehicle along a narrow aisle. The guidance system comprises guide means affixed to the floor and extending along the aisle for defining a vehicular path through the aisle. Follower means are detachably connected to the vehicle and carry means that engage the guide means for directing the vehicle along the aisle.

Other objects and advantages of this invention will become more apparent as this description proceeds, particularly when considered in conjunction with the accompanying drawings, wherein:

FIGURE 1 is a vertical cross-sectional view taken through one aisleway of a warehouse embodying this invention;

FIGURE 2 is a top plan view of the warehouse shown in FIGURE 1 illustrating the approach of an order-picking vehicle to a guidance system that extends along the aisle;

FIGURE 3 is an enlarged perspective view taken generally along the lines 3—3 of FIGURE 1 and shows the guidance system in more detail;

FIGURE 4 is a perspective view, taken from the front, of the guidance system.

Referring now in detail to the drawings and in particular to FIGURES 1 and 2, a portion of a warehouse embodying this invention is identified generally by the reference numeral 11. The warehouse 11 is comprised of a plurality of upstanding storage racks of which two, 12 and 13, are shown. Adjacent pairs of the storage racks define longitudinally extending aisleways 14. An order-picking self-propelled dirigible vehicle, indicated generally by the reference numeral 15, is adapted to run through the warehouse 11 and down the aisleway 14 so that an operator may select merchandise or other articles from the storage racks 12 and 13. The vehicle 15 may be of any of the known type vehicles for this purpose such as a fork lift truck and is depicted as including a pair of front wheels 16 supported on extending arms 17 at each side of the vehicle 15. A rear pair of wheels 18 are driven in any suitable manner and a steering mechanism (not shown) of a known type is provided for steering the driven wheels 18.

A guidance system comprised of a guide rail, indicated generally by the reference numeral 19, and a follower mechanism 20, that is adapted to be detachably connected to the vehicle 15, is provided for guiding the vehicle 15 down the aisleway 14. Since the vehicle 15 is automatically guided down the aisleway 14 rather than being steered down it by the operator, narrower aisles can be utilized without any danger of damage to the storage racks 12 and 13.

The guide rail 19 comprises a generally T-shaped structural member having a base portion 21 (FIGURES 3 and 4) that is affixed in any suitable manner to the warehouse floor 22 that extends along the aisleway adjacent the storage rack at one side thereof. The guide rail 19 has an upstanding leg 23 which, due to the side placement of the guide rail 19, will not interfere with normal traffic along the aisle 14.

The follower member 20 comprises an elongated support bar 25 that is detachably connected to one side of the vehicle 15. The detachable connection permits the follower member 20 to be utilized with different vehicles or with more than one vehicle of the same type, as will become more apparent as this description proceeds. Supported at the forward end of the support member 20 adjacent one of the front wheels 16 is a first pair of spaced vertically extending shafts 26. Journaled upon the shaft 26 at the lower side of the support member 25 are a pair of roller followers 27 that define a gap therebetween for engagement of the upstanding guide rail leg 23 (FIGURE 4). A pair of forwardly projecting members 28 extend from the support member 25 in front of the rollers 27 to protect them from forward impacts. It will be noted, however, that the side of at least one of the roller followers 27 extends outwardly from the side of the protecting member 28. In the illustrated embodiment, both roller members 27 extend beyond the protecting members 28 in a direction transversely to the plane of the shaft 26.

At the rear end of the support member 25 and adjacent one of the rear vehicle wheels 18, a pair of vertical shafts 31 are carried by the support member. A pair of roller followers 32 are rotatably supported on the shafts 31 and define a gap therebetween that is adapted to engage the upstanding guide rail leg 23.

The engagement of the guide rail leg 23 by the follower members 27 and 32 causes the vehicle 27 to follow the shape of the upstanding leg 23 to define a path for the vehicle 15 along the aisleway 14. Although a straight line path is illustrated in the preferred embodiment, it has been found that the guide rail 19 and follower member 20 will coact to guide the vehicle 15 along a non-liner path. This guiding movement is accomplished without any direct mechanical connection between the follower mechanism 20 and the steering system of the vehicle. In other words, the operator of the vehicle 15 may drive it along the aisle 14 at any speed without necessitating manipulation of the steering wheel or any disconnection of the steering linkage. The advantages of this system should be readily obvious since the vehicle 15 need not be altered in any way other than by the detachable connection of the guide mechanism 20. The vehicle 15, therefore, may be utilized for conventional purposes either with or without the follower mechanism 20 in place.

To assist in leading the follower mechanism 20 and particularly the rollers 27 and 32 onto the upstanding leg 23 of the guide rail 19, a lead-on rail, indicated generally by the reference numeral 33, is provided at at least one end of each aisleway. The lead-on rail 33 has an upstanding somewhat arcuately shaped leg 34 that terminates adjacent the leading end of the guide rail 19 and overlaps it slightly. A gap 35 is provided between the upstanding legs 23 and 34 and this gap is substantially equal to the width of one of the roller followers 27.

When the vehicle 15 is driven through the portion of the warehouse outside of the aisleway 14 and the operator desires to enter into the aisleway 14 he merely steers the vehicle into the lead-on rail 33 so that the front roller follower 27 engages the side of the upstanding leg 34 of the lead-on rail 33 (FIGURE 2). The contact between the roller follower 27 and the lead-on rail leg 34 will cause the vehicle 15 to be directed toward the guide rail leg 23 as the vehicle 15 approaches the aisle 14. The leg 23 will then be received between the front followers 27 and eventually the rear followers 32 so that the vehicle 15 will be guided accurately along the aisleway 14. This lead-on action is also accomplished without any connection to the vehicle steering mechanism other than the necessity for the operator to steer the vehicle 15 into initial contact between the roller 27 and the lead-on rail 33.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In combination a warehouse or the like having a floor, means defining an aisleway extending along at least a portion of said floor, a self-propelled multi-purpose dirigible vehicle adapted to be driven in operator selected paths along said floor and at times to operate in said aisleway, guide means extending along said aisleway for defining a vehicular path through said aisleway, follower means detachably connected to said vehicle, and means on said follower means for cooperation with said guide means for directing said vehicle down said aisleway.

2. In combination a warehouse or the like having a floor, means defining an aisleway extending along at least a portion of said floor, a self-propelled multi-purpose dirigible vehicle having at least one steerable wheel and means for steering said wheel, said vehicle being adapted to be driven along said floor in operator selected paths and being adapted at times to operate in said aisleway, guide means extending along said aisleway for defining a vehicular path therethrough, follower means detachably connected to said vehicle, and means on said follower means cooperating with said guide means for directing said vehicle down said aisleway, said last named means being effective to guide said vehicle without direct mechanical connection to said steering means.

3. In combination a warehouse or the like having a floor, means defining an aisleway extending along at least a portion of said floor, a self-propelled multi-purpose dirigible vehicle adapted to be driven in operator selected paths along said floor and at times to operate in said aisleway, guide means affixed to said floor along said aisleway for defining a vehicular path through said aisleway, follower means detachably connected to said vehicle, means on said follower means cooperating with said guide means for directing said vehicle down said aisleway, and lead-on means fixed to the floor at the end of said aisleway, said lead-on means having means for engaging said last-named means for directing said follower means into engagement with said guide means, said lead-on means terminating adjacent one end of said guide means.

4. In combination a warehouse or the like having a floor, means defining an aisleway extending along at least a portion of said floor, a self-propelled multi-purpose vehicle having at least one dirigible wheel and means for steering said wheel, said vehicle being adapted to be driven along said floor in operated selected paths and being adapted to operate in said aisleway, guide means affixed to said floor and extending along said aisleway for defining a vehicular path therethrough, follower means detachably connected to said vehicle, means on said follower means for cooperating with said guide means for directing said vehicle down said aisleway without direct mechanical connection to said steering means, and lead-on means affixed to the floor at the end of said aisleway, said lead-on means having means for engaging said last named means for directing said follower means into engagement with said guide means, said lead-on means terminating adjacent one end of said guide means.

5. A follower assembly for guiding a dirigible vehicle down an aisle and adapted to be detachably connected to the vehicle, said follower assembly comprising an elongated support member, a first pair of follower members journaled for rotation at one end of said support member and defining a gap therebetween adapted to receive a guide rail, a second pair of follower members journaled for rotation at the other end of said support member and defining a gap therebetween adapted to receive a guide rail, the respective of each of said pair of follower members being supported for rotation about a substantially vertically extending axis, and a pair of forwardly extending protecting members extending from said support member and terminating beyond said first pair of follower members, said protecting members defining a V-shaped bight leading to the gap between said first pair of follower members.

6. A self-propelled order-picking vehicle having at least one driven wheel, means for guiding said vehicle along a guide rail comprising a support member adapted to be detachably connected to one side of said vehicle, a first pair of follower members supported for rotation at one end of said support member and adjacent the forward end of said vehicle, said first pair of follower members defining a gap therebetween adapted to engage the guide rail, and a second pair of follower members supported for rotation at the other end of said support member and adjacent the rearward end of said vehicle, said second pair of follower members defining a gap therebetween adapted to receive the guide rail.

7. In combination a warehouse or the like having a floor, means defining an aisleway extending along at least at portion of said floor, a self-propelled multi-purpose dirigible vehicle adapted to be driven in operator selected paths along said floor and at times to operate in said aisleway, a guide rail having an upstanding leg affixed to said floor at one side of said aisleway and extending therealong for defining a vehicular path through said aisleway, a self-propelled vehicle, a support member detachably connected to one side of said vehicle, a first pair of follower members supported for rotation about vertical axes at one end of said support member and defining a gap therebetween, said upstanding leg of said guide rail being positioned in said gap when said vehicle is being operated in said aisleway, and a second pair of follower members supported for rotation about vertical axes at the other end of said support member and defining a gap therebetween, the upstanding leg of said guide rail being received in the gap between said second pair of follower members when said vehicle is being operated in said aisleway.

8. A guidance system for a multi-purpose dirigible vehicle adapted at times to operate in a narrow aisle comprising a guide rail having an upstanding leg affixed to the floor at one side of the aisle and extending therealong for defining a vehicular path through said aisle, a self-propelled vehicle, a support member detachably connected to one side of said vehicle, a first pair of follower members supported for rotation about vertical axes at one end of said support member and defining a gap therebetween, said upstanding leg of said guide rail being positioned in said gap, and a second pair of follower members supported for rotation about vertical axes at the other end of said support member and defining a gap therebetween, the upstanding leg of said guide rail being received in the gap between said second pair of follower members, said vehicle having at least one dirigible wheel and means for steering said wheel, the follower means being adapted to guide the vehicle down the aisle without any direct mechanical connection to said means for steering said wheel.

9. A guidance system for a multi-purpose dirigible vehicle adapted at times to operate in a narrow aisle comprising a guide rail affixed to the floor and having an upstanding leg extending along a side of said aisle for defining a vehicular path therealong, a lead-on rail affixed to the floor at the end of said aisle and having an upstanding leg, the upstanding leg of said lead-on rail terminating adjacent one end of the upstanding leg of said guide rail and being spaced therefrom, a dirigible self-propelled vehicle, a first pair of follower members pivotally supported about vertical axes at one end of said support member and defining a gap therebetween, the spacing of said gap being substantially equal to the width of the upstanding leg of said guide rail for engagement of said guide rail between said first pair of follower members, the spacing between the upstanding legs of said guide rail and said lead-on rail being substantially equal to the width of one of said follower members for leading said first pair of follower members onto said guide rail by engagement of said one follower member with a side of the upstanding leg of said lead-on rail, and a second pair of follower members supported for rotation about vertical axes at the other end of said support member, said second pair of follower members defining the gap therebetween and adapted to receive the upstanding leg of said guide rail.

10. The combination as set forth in claim 9 wherein the vehicle includes at least one dirigible wheel and means for steering said wheel, the follower members being adapted to guide said vehicle along the guide rail without any direct mechanical connection to said means for steering said wheel.

References Cited
UNITED STATES PATENTS

| | | | |
|---|---|---|---|
| 508,480 | 11/1893 | Kirchner et al. | 104—244 |
| 977,407 | 11/1910 | Juneau | 104—245 |
| 2,590,317 | 3/1952 | Henderson | 104—264 |

ARTHUR L. LA POINT, *Primary Examiner.*

D. F. WORTH, *Assistant Examiner.*